US009859937B2

(12) United States Patent
Chien

(10) Patent No.: US 9,859,937 B2
(45) Date of Patent: Jan. 2, 2018

(54) CHILD'S INTELLIGENT WATCH WITH VIDEO CALL FUNCTION

(71) Applicant: DOKI TECHNOLOGIES LIMITED, Hong Kong (CN)

(72) Inventor: Casper Chien, Hongkong (CN)

(73) Assignee: DOKI TECHNOLOGIES LIMITED, Hongkong (CN)

( * ) Notice: Subject to any disclaimer, the term of this patent is extended or adjusted under 35 U.S.C. 154(b) by 0 days.

(21) Appl. No.: 15/398,737

(22) Filed: Jan. 5, 2017

(65) Prior Publication Data
US 2017/0117928 A1 Apr. 27, 2017

(30) Foreign Application Priority Data

Mar. 17, 2016 (HK) .................. 16103158.4

(51) Int. Cl.
| H04M 1/00 | (2006.01) |
| H04M 11/04 | (2006.01) |
| H04W 24/00 | (2009.01) |
| H04B 1/3827 | (2015.01) |
| H04W 4/02 | (2009.01) |
| H04M 1/02 | (2006.01) |
| H04N 7/14 | (2006.01) |
| G04B 47/00 | (2006.01) |
| H04W 4/22 | (2009.01) |

(52) U.S. Cl.
CPC ............. *H04B 1/385* (2013.01); *G04B 47/00* (2013.01); *H04M 1/0264* (2013.01); *H04N 7/142* (2013.01); *H04W 4/02* (2013.01); *H04N 2007/145* (2013.01); *H04W 4/22* (2013.01)

(58) Field of Classification Search
CPC ....... H04W 4/02; H04W 4/021; H04W 4/025; H04W 64/003; H04W 88/02; H04M 1/72572; H04M 2242/04; H04M 2242/30; H04L 51/20; H04L 67/18
USPC ........... 455/90.3, 404.1, 456.1, 456.3, 456.6, 455/556.1, 569.1, 575.1
See application file for complete search history.

(56) References Cited

U.S. PATENT DOCUMENTS

| 7,511,627 | B2* | 3/2009 | Holoyda ............ G08B 21/0202 340/573.4 |
| 7,741,806 | B2* | 6/2010 | Kuhlmann ............ H02J 7/0042 320/104 |
| 9,083,111 | B2* | 7/2015 | Riering-Czekalla H01R 13/6205 |
| 9,521,245 | B2* | 12/2016 | Yang ....................... G04G 21/04 |
| 9,568,891 | B2* | 2/2017 | Adams .................... G04G 21/08 |
| 9,600,992 | B1* | 3/2017 | Kolla ................. G08B 21/0261 |

(Continued)

*Primary Examiner* — Quochien B Vuong

(57) ABSTRACT

A child's intelligent watch with a video call function includes a shell, watchbands, a battery, a mainboard assembly, a display screen assembly, a battery cover, a power button and a Home button and further comprises a camera module, wherein the watchbands are arranged on the two sides of the shell, the battery and the mainboard assembly are arranged in the shell, the display screen assembly is embedded in the front surface of the shell and connected with the mainboard assembly, the battery cover is embedded in the back side of the shell, and the power button and the Home button are arranged on the surface of one side of the shell; the camera module is arranged in the shell and electrically connected with the mainboard assembly, and the front end of the camera module is located in the front surface of the shell.

12 Claims, 3 Drawing Sheets

(56) References Cited

U.S. PATENT DOCUMENTS

| | | | |
|---|---|---|---|
| 2011/0205851 A1* | 8/2011 | Harris | G04G 9/0064 |
| | | | 368/14 |
| 2016/0062319 A1* | 3/2016 | Kim | G04C 10/00 |
| | | | 368/204 |
| 2016/0254692 A1* | 9/2016 | Shcherbatko | H02J 7/025 |
| | | | 307/104 |
| 2016/0338642 A1* | 11/2016 | Parara | A61B 5/681 |
| 2016/0344224 A1* | 11/2016 | Hong | H02J 7/025 |

* cited by examiner

CHILD'S INTELLIGENT WATCH WITH VIDEO CALL FUNCTION

CROSS REFERENCE OF RELATED APPLICATION

The present invention claims priority under 35 U.S.C. 119(a-d) to HK 16103158.4, filed Mar. 17, 2016.

BACKGROUND OF THE PRESENT INVENTION

Field of Invention

The present invention relates to a technical field of communication, in particular to a child's intelligent watch with a video call function and a help call function in an emergency.

Description of Related Arts

In recent years, wearable equipment, such as intelligent watches in the first place, have sprung up. The intelligent watches have call functions after being matched with smart phones, however, most intelligent watches do not have independent communication functions and have to be combined with smart phones to be used for calling, and the intelligent watches have a limitation while providing certain convenience for wearers. In addition, considering the safety of the juveniles in the school age stages, anti-lost bracelets appear in the market and can be used for real-time positioning, however, no other function can be achieved; in this way, although existing children's intelligent watches combine the call function with the anti-lost function to achieve more functions, certain limitations still exist.

SUMMARY OF THE PRESENT INVENTION

For overcoming the defects of the prior art, the present invention aims to provide a child's intelligent watch which is provided with a camera module and enables a wearer to make and receive video call conveniently, and an SOS module is arranged in the child's intelligent watch so that the wearer can send out a message for help conveniently at the time of an emergency.

According to the technical scheme adopted by the present invention for realizing the purposes: the child's intelligent watch with a video call function comprises a micro controller unit (MCU) processor and further comprises a liquid crystal display, a button module, a global positioning system (GPS) receiving module, a Wi-Fi (wireless fidelity) module, a camera module, a wideband code division multiple access (WCDMA)+global system for mobile communication (GSM) module and a battery management unit, wherein the MCU processor is connected with a sound module, the liquid crystal display is connected with the MCU processor, the WCDMA+GSM module is connected with the MCU processor and further connected with a WCDMA+GSM antenna, and the battery management unit is connected with the MCU processor and further connected with a rechargeable battery; a local guard fence range is set in the child's intelligent watch, and a local position is compared with a position range of the guard fence after a GPS or Wi-Fi locating position is obtained by the child's intelligent watch; if the local position does not go beyond the position range of the guard fence, no further action is taken; if the local position goes beyond the position range of the guard fence, a local prompt can be sent out or prompt is sent out to a mobile phone also provided with an app.

The child's intelligent watch with video call function further comprises a shell, watchbands, a battery, a mainboard assembly, a display screen assembly, a battery cover, a power button and a Home button, wherein the watchbands are arranged on two sides of the shell, the battery and the mainboard assembly are arranged in the shell, the display screen assembly is embedded in a front surface of the shell and connected with the mainboard assembly, the battery cover is embedded in a back side of the shell, and the power button and the Home button are arranged on a surface of one side of the shell; the child's intelligent watch further comprises a camera module and an SOS functional module, wherein the camera module is arranged in the shell and electrically connected with the mainboard assembly, a front end of the camera module is located in a front surface of the shell, the SOS functional module is arranged in the shell and connected with the mainboard assembly, and an SOS button connected with the SOS functional module is arranged on a surface of the other side of the shell.

Furthermore, an internal support, a microphone, a loudspeaker and a vibrating motor are further arranged in the shell, and the microphone, the loudspeaker and the vibrating motor are connected with the mainboard assembly; the battery is arranged in the internal support, and the mainboard assembly is arranged at a bottom of the internal support and a bottom of the battery.

A SIM card slot communicating with the mainboard assembly is formed in the battery cover, and a SIM card cover used for sealing the SIM card slot is arranged on a back side of the battery cover.

A GPS module electrically connected with the mainboard assembly is arranged in the internal support.

Jacks with data transmission and charging functions are arranged in the battery cover, and charging elastic pins are arranged at bottoms of the jacks.

A magnet is further arranged in the battery cover and used for adsorbing a charging base.

The present invention has the beneficial technical effects that the camera module is arranged in the shell, the front end of the camera module is located in the front surface of the shell, and thus the wearer can make and receive video call conveniently by the adoption of the camera module; since the child's intelligent watch of the present invention is worn by a child, the environment around the position where the child is located can be known while a call to the child is made, and the child is prevented from getting lost; meanwhile, the SOS module is arranged in the shell, and the SOS button communicating with the SOS module is arranged on the surface of the shell so that the wearer can send out a message for help conveniently at the time of an emergency, and accordingly the wearer can be rescued in time.

The present invention has the hardware advantages that by the adoption of the integrally-formed shell, the child's intelligent watch is firmer; the TPE-X watchbands are more breathable and safer; the SOS button is independent and is not used together with other buttons, so that confusion of the child is unlikely to occur; the SOS button is located at the upper left corner of the shell, so that the SOS button is habitually operated with the thumb of the right hand more suitably; by the adoption of a battery holder, the battery is made firmer and is not prone to being disconnected with a mainboard, and meanwhile, the holder enables a certain gap to exist between the battery and the mainboard, so that heat dissipation is better facilitated.

Furthermore, the present invention has the system advantage that an Android system of a WCDMA 3G form is adopted and is different from a non-intelligent system of a 2G GSM form of other child watches. The Android system has the advantages that the intelligent system can be internally arranged in a third side (such as Google maps SDK) for auxiliary positioning, and the SDK has powerful positioning and automatic geographic position correcting functions. By the adoption of the WCDMA 3G form, uplink and downlink data sizes are larger, the voice intercom quality is more excellent, and the speed is higher. Only in this way can the bandwidth required by video calls be supported.

Furthermore, the present invention has the guard fence advantage that a local guard fence position of the watch can be set through an app. After a GPS or Wi-Fi locating position is obtained by the watch, if the local position does not go beyond the range of the guard fence, no further action is taken; if the local position goes beyond the range of the guard fence, a local prompt can be sent out or prompt is sent out to a mobile phone also provided with an app. The guard fence can be set based on a fixed geographical position, such as a school and a residence and can also be set based on a mobile position such as the position of a mobile phone also provided with an app. The child's intelligent watch has the advantage of being different from the way of other products in the market that a position needs to be obtained, and the position is sent to a server for comparison by establishing connection once. The child's intelligent watch further has the advantages that the comparison speed of the watch is higher, comparison can be conducted by the server without sending position information to the server frequently, and the electricity of the watch can be greatly saved.

DETAILED DESCRIPTION OF THE PREFERRED EMBODIMENT

For a better understanding of the scheme of the present invention by those skilled in the field, a further detailed description of the present invention is given with accompanying drawings and embodiments as follows.

Figure 1:
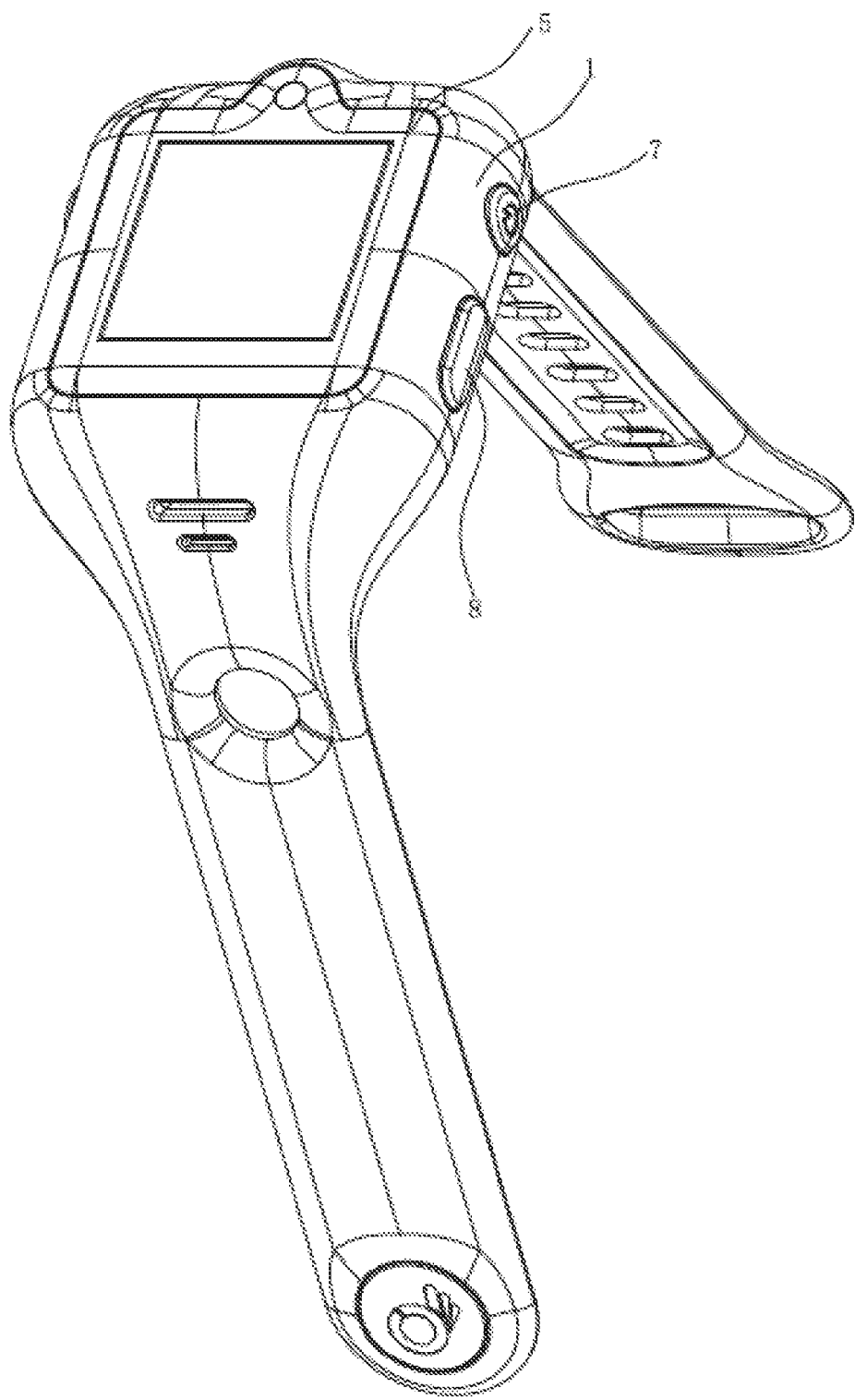
FIG. 1 is a stereo view in an overlooking direction of the present invention.
Figure 2:
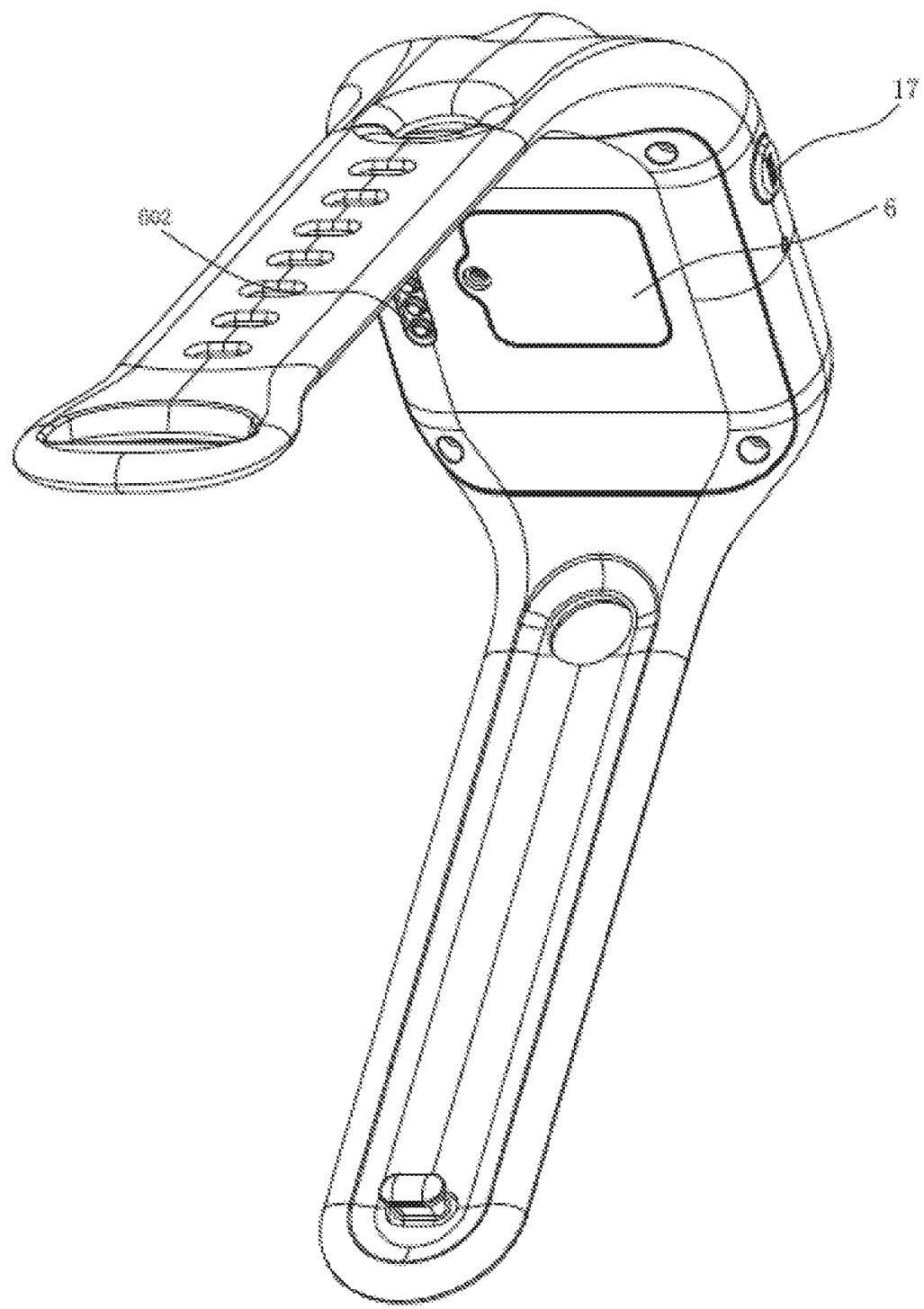
FIG. 2 is stereo view in a looking-up direction of the present invention.
Figure 3:
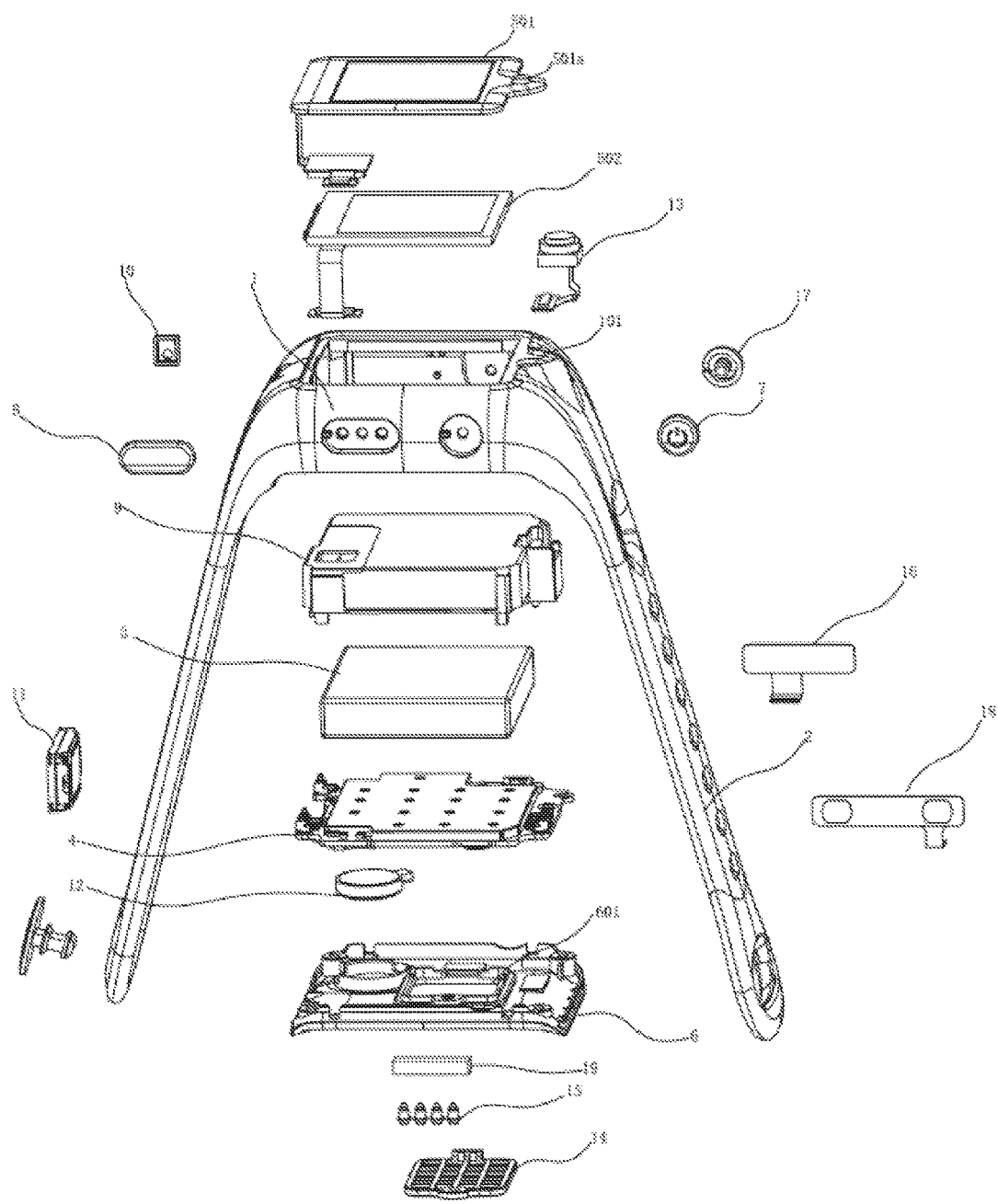
FIG. 3 is an expanded view of the present invention.

As is shown in FIGS. 1-3, a child's intelligent watch with a video call function comprises a shell 1, watchbands 2, a battery 3, a mainboard assembly 4, a display screen assembly 5, a battery cover 6, a power button 7 and a Home button 8, wherein the watchbands 2 are arranged on two sides of the shell, the battery 3 and the mainboard assembly 4 are arranged in the shell, the display screen assembly 5 is embedded in a front surface of the shell and connected with the mainboard assembly 4, the battery cover 6 is embedded in a back side of the shell 1, and the power button 7 and the Home button 8 are arranged on a surface of one side of the shell;

an internal support 9, a microphone 10, a loudspeaker 11 and a vibrating motor 12 are further arranged in the shell 1, and the microphone 10, the loudspeaker 11 and the vibrating motor 12 are connected with the mainboard assembly; the battery 3 is arranged in the internal support 9, and the mainboard assembly 4 is arranged at a bottom of the internal support 9 and a bottom of the battery 3.

The display screen assembly 5 is composed of a TP screen, namely a touch panel screen 501, and a display screen 502.

A home button and power button module 18 is arranged in the shell 1 and connected with the mainboard assembly 4, the power button 7 and the Home button 8.

The child's intelligent watch further comprises a camera module 13 arranged in the shell 1 and electrically connected with the mainboard assembly 4, wherein a front end of the camera module is located in the front surface of the shell 1, a containing hole 101 for containing the front end of the camera module is formed in the front surface of the shell 1, a through hole 501a communicating with the containing hole 101 is formed in one end of the display screen, and the front end of the camera module can be seen from the through hole 501a. By adoption of the camera module 13, a wearer can make and receive video call conveniently; since the child's intelligent watch is worn by a child, the environment around the position where the child is located can be known when a call to the child is made, and a measure can be taken in time when it is found that the child is in danger.

An SOS functional module 16 is arranged in the shell and connected with the mainboard assembly, and an SOS button 17 connected with the SOS functional module is arranged on a surface of the other side of the shell 1.

A GPS module (not shown in FIGs) electrically connected with the mainboard assembly is arranged in the internal support and used for positioning the wearer in real time, so that the child wearing the child's intelligent watch is prevented from getting lost.

A SIM card slot 601 connected with the mainboard assembly is formed in the battery cover 6, and a SIM card cover 14 used for sealing the SIM card slot is arranged on a back side of the battery cover.

Jacks 602 with data transmission and charging functions are arranged in the battery cover 6, and charging elastic pins 15 are arranged at bottoms of the jacks.

A magnet 19 is further arranged in the battery cover 6 and used for absorbing a charging base.

Although the description of the present invention is given with the embodiments, it should be known by those skilled in the field that various alterations and changes not deviating from the spirit of the present invention exist, and the alterations and changes are hopefully included in the claims and do not deviate from the spirit of the present invention.

What is claimed is:

1. A child's intelligent watch with a video call function, comprising a micro controller unit (MCU) processor and further comprises a liquid crystal display, a button module, a global positioning system (GPS) receiving module, a Wi-Fi (wireless fidelity) module, a camera module, a wideband code division multiple access (WCDMA)+global system for mobile communication (GSM) module and a battery management unit, wherein the MCU processor is connected with a sound module, the liquid crystal display is connected with the MCU processor, the WCDMA+GSM module is connected with the MCU processor and further connected with a WCDMA+GSM antenna, and the battery management unit is connected with the MCU processor and further connected with a rechargeable battery; a local guard fence range is set in the child's intelligent watch, and a local position is compared with a position range of a guard fence after a GPS or Wi-Fi locating position is obtained by the child's intelligent watch; if the local position does not go beyond the position range of the guard fence, no further action is taken; if the local position goes beyond the position range of the guard fence, a local prompt is sent out or prompt is sent out to a mobile phone also provided with an app;

wherein the child's intelligent watch with the video call function further comprises a shell which is integrally formed, watchbands, a battery, a mainboard assembly, a display screen assembly, a battery cover, a power button and a Home button, wherein the watchbands are arranged on two sides of the shell, the battery and the mainboard assembly are arranged in the shell, the display screen assembly is embedded in a front surface of the shell and connected with the mainboard assembly, the battery cover is embedded in a back side of the shell, and the power button and the Home button are arranged on a surface of one side of the shell; wherein the child's intelligent watch further comprises a camera module and an SOS functional module, the camera module is arranged in the shell and electrically connected with the mainboard assembly, a front end of the camera module is located in a front surface of the shell, the SOS functional module is arranged in the shell and connected with the mainboard assembly, and an SOS button connected with the SOS functional module is arranged on an upper left corner of the shell, in such a manner that the SOS button is independent and is not used together with other buttons.

2. The child's intelligent watch with the video call function according to claim 1, wherein an internal support, a microphone, a loudspeaker and a vibrating motor are further arranged in the shell, and the microphone, the loudspeaker and the vibrating motor are connected with the mainboard assembly; the battery is arranged in the internal support, and the mainboard assembly is arranged at a bottom of the internal support and a bottom of the battery, wherein a certain gap is maintained between the battery and the mainboard assembly.

3. The child's intelligent watch with the video call function according to claim 2, wherein a SIM card slot communicating with the mainboard assembly is formed in the battery cover, and a SIM card cover used for sealing the SIM card slot is arranged on a back side of the battery cover.

4. The child's intelligent watch with the video call function according to 3, wherein jacks with data transmission and charging functions are arranged in the battery cover, and charging elastic pins are arranged at bottoms of the jacks.

5. The child's intelligent watch with the video call function according to claim 4, wherein a magnet is further arranged in the battery cover and used for adsorbing a charging base.

6. The child's intelligent watch with the video call function according to claim 2, wherein a GPS module electrically connected with the mainboard assembly is arranged in the internal support.

7. The child's intelligent watch with the video call function according to claim 1, wherein a SIM card slot communicating with the mainboard assembly is formed in the battery cover, and a SIM card cover used for sealing the SIM card slot is arranged on a back side of the battery cover.

8. The child's intelligent watch with the video call function according to 7, wherein jacks with data transmission and charging functions are arranged in the battery cover, and charging elastic pins are arranged at bottoms of the jacks.

9. The child's intelligent watch with the video call function according to claim 8, wherein a magnet is further arranged in the battery cover and used for adsorbing a charging base.

10. The child's intelligent watch with the video call function according to claim 1, wherein a GPS module electrically connected with the mainboard assembly is arranged in the internal support.

11. The child's intelligent watch with the video call function according to 1, wherein jacks with data transmission and charging functions are arranged in the battery cover, and charging elastic pins are arranged at bottoms of the jacks.

12. The child's intelligent watch with the video call function according to claim 11, wherein a magnet is further arranged in the battery cover and used for adsorbing a charging base.

\* \* \* \* \*